Oct. 4, 1960 E. C. MONTGOMERY 2,954,644
APPARATUS FOR PRODUCING MULTIPLE SHEET GLAZING UNITS
Original Filed Nov. 14, 1955 4 Sheets-Sheet 1

INVENTOR.
Edwin C. Montgomery
BY
Nobbe & Swope
ATTORNEYS

INVENTOR.
Edwin C. Montgomery
BY
Nobbe & Swope
ATTORNEYS

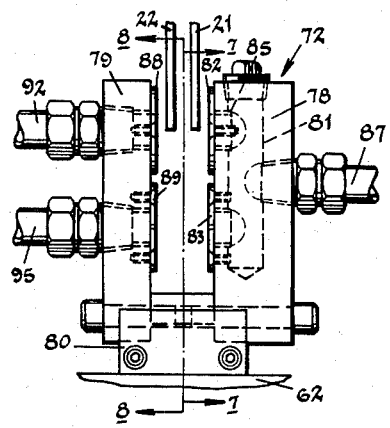
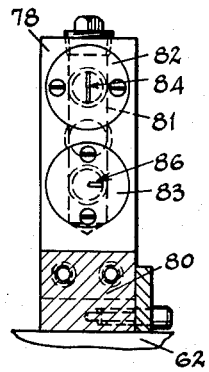
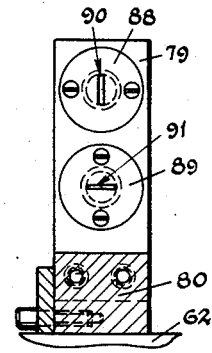
Fig. 6  Fig. 7  Fig. 8
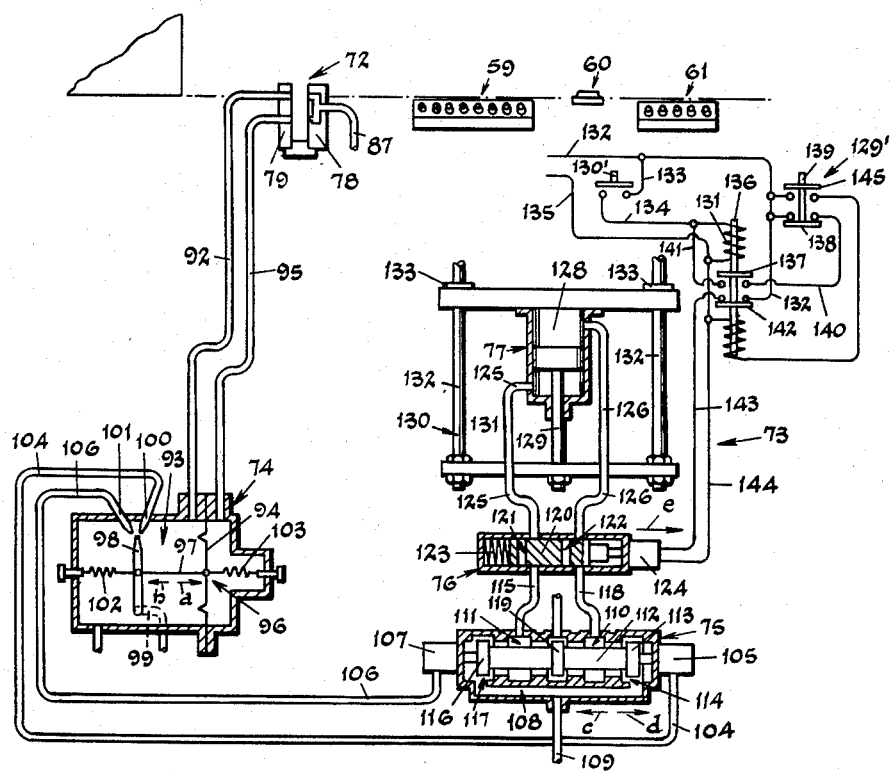
Fig. 9
INVENTOR.
Edwin C. Montgomery
BY
Nobbe & Swope
ATTORNEYS Oct. 4, 1960 — E. C. MONTGOMERY — 2,954,644
APPARATUS FOR PRODUCING MULTIPLE SHEET GLAZING UNITS
Original Filed Nov. 14, 1955

INVENTOR.
Edwin C. Montgomery
BY
Hobbs & Swope
ATTORNEYS

United States Patent Office 2,954,644
Patented Oct. 4, 1960

2,954,644

APPARATUS FOR PRODUCING MULTIPLE SHEET GLAZING UNITS

Eldwin C. Montgomery, Shreveport, La., assignor to Libbey-Owens-Ford Glass Company, Toledo, Ohio, a corporation of Ohio Continuation of application Ser. No. 546,511, Nov. 14, 1955. This application Oct. 17, 1958, Ser. No. 768,532

13 Claims. (Cl. 49—1)

This invention relates broadly to all-glass multiple sheet glazing units, and more particularly to improved apparatus for sealing together the peripheral edge portions of spaced sheets of glass to produce hermetically sealed all-glass glazing units.

This application is a continuation of my copending application Serial No. 546,511, filed November 14, 1955, now abandoned.

Multiple sheet all-glass glazing units may be described generally as comprising two or more sheets of glass which are sealed together entirely around their edge portions in spaced relation to provide a hermetically sealed dead air space therebetween. Due principally to their insulating and condensation preventing qualities, such units have become well established in the building trades and have found wide usage as windows for buildings, show cases, vehicles, refrigerators, and the like.

A principal object of this invention therefore is to provide an improved all-glass, multiple sheet glazing unit which is hermetically sealed.

Another object of the invention is to produce an all-glass glazing unit having a sealed peripheral edge wall which is uniform in appearance along its outer surface and has a substantially uniform inner radius of seal.

A still further object of the invention is to provide a novel apparatus for positioning the sealing elements used in the sealing of the spaced sheets of glass to accommodate for variations in the position of the glass sheets with respect to such sealing elements during the sealing process.

A still further object of the invention is to provide in apparatus for sealing together the edge portions of spaced sheets novel means for aligning the sealing means of the apparatus with the edge portions of the sheets as relative movement is effected between said sheets and said sealing means.

Other objects and advantages of the invention will become more apparent during the course of the following description when taken in connection with the accompanying drawings.

In the drawings, wherein like numerals are employed to designate like parts throughout the same:

Fig. 6 is a fragmentary front elevation view of a portion of the sensing means for the sealing element positioning device;

Fig. 7 shows the sensing means as viewed along lines 7—7 of Fig. 6;

Fig. 8 shows the sensing means as viewed along lines 8—8 of Fig. 6;

Fig. 9 is a schematic diagram of the control mechanism for the apparatus;

Briefly stated, the present invention contemplates the production of hermetically sealed glazing units made entirely of glass and is particularly adaptable when used with the apparatus for forming all-glass multiple sheet glazing units as described in copending application Serial No. 464,012, filed October 22, 1954 in the names of Eldwin C. Montgomery, Harry N. Dean, Eugene W. Babcock, and Donald E. Sharp and will be described in that connection here.

Figure 1:
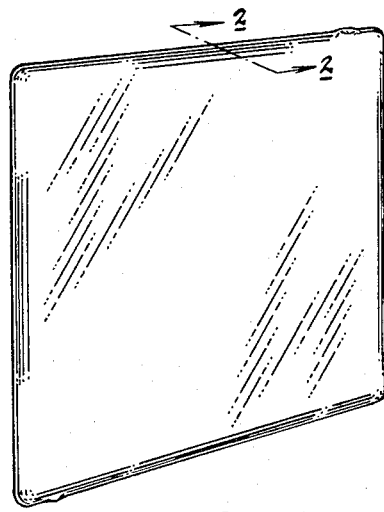
Figs. 1 is a perspective view of an all-glass multiple sheet glazing unit of the type with which the invention is concerned.
Figure 2:
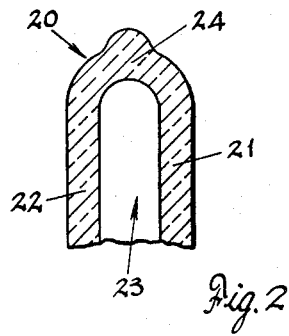
Fig. 2 is a sectional view of the sealed edge wall of the multiple sheet glazing unit taken substantially along lines 2—2 of Fig. 1.

With reference now to the drawings, there is shown in Figs. 1 and 2 an all-glass glazing unit 20 produced in accordance with this invention which comprises two sheets of glass 21 and 22 spaced from one another as at 23 by edge wall portions 24.

Figure 3:
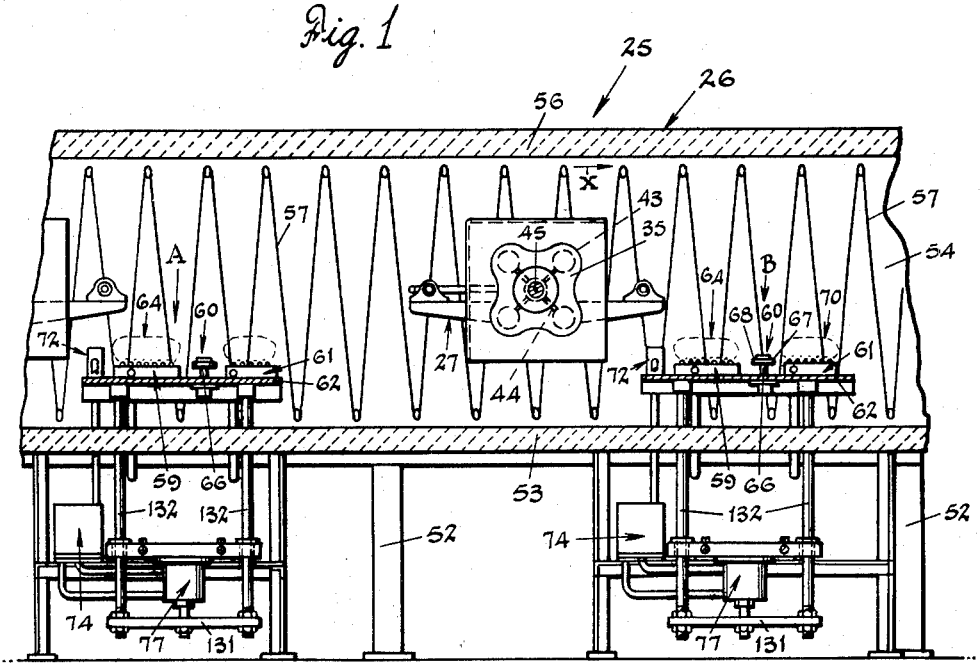
Fig. 3 is a fragmentary vertical sectional view of apparatus for producing all-glass multiple sheet glazing units according to this invention.
Figure 4:
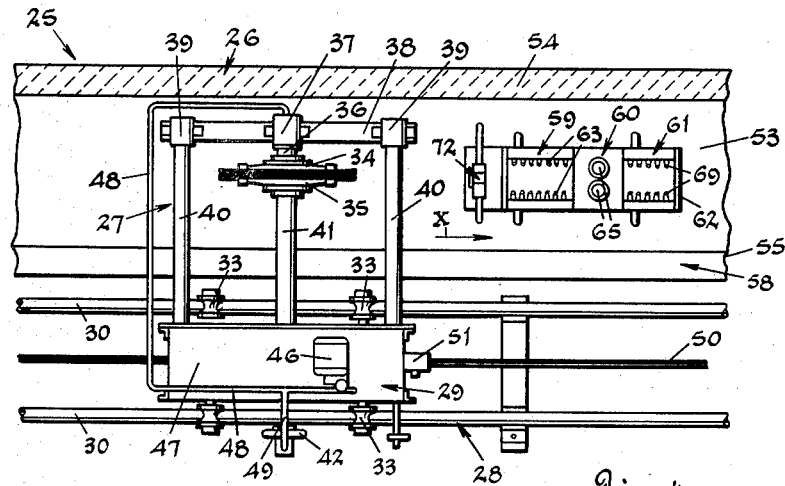
Fig. 4 is a fragmentary sectional plan view of a portion of the apparatus shown in Fig. 3 showing the conveyor apparatus in relation to the sealing elements of the apparatus.
Figure 5:
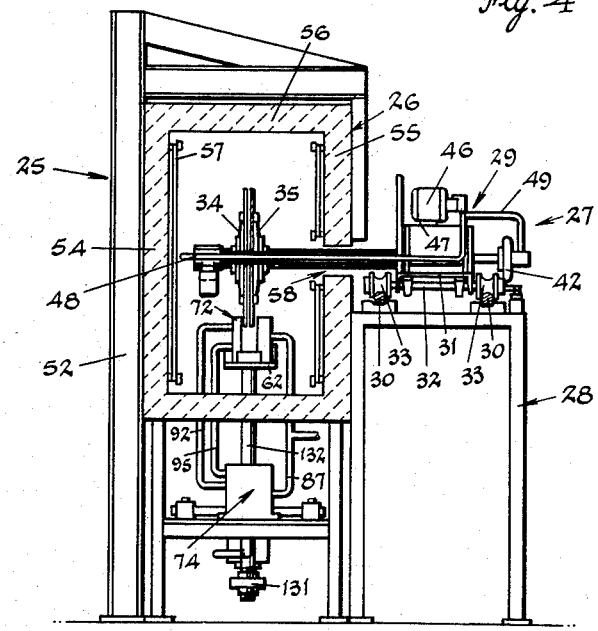
Fig. 5 is a fragmentary vertical sectional view of the apparatus for producing multiple sheet glazing units.

As will best be seen in Figs. 3, 4, and 5, the means by which the all-glass multiple sheet glazing units 20 may be produced is designated generally by the numeral 25 and includes a furnace 26, and a conveyor means 27 for carrying the sheets to be fused through the furnace. Within the furnace there are arranged a plurality of sealing areas designated by the letters A and B respectively through which sheets 21 and 22 pass during the sealing process.

The conveyor 27 includes a rail support frame 28 and a carriage 29 adapted to ride on rails 30 mounted on the support frame. The carriage 29 which is adapted to move the spaced sheets 21 and 22 through the furnace, includes a substantially rectangular base 31 (Fig. 5) supported on axles 32 which carry wheels 33 at their ends. The wheels 33 have grooves therein formed to substantially the curvature of the rails so as to accurately guide the carriage as it moves adjacent the furnace.

Vacuum platens 34 and 35 are provided on the carriage to support the sheets 21 and 22 in substantially vertical and spaced position with respect to one another as the carriage moves the sheets through the furnace. More particularly, the vacuum platen 34 is mounted on one end of a stub shaft 36 (Fig. 4) which is rotatably mounted adjacent its other end in a bearing 37 on a cross arm 38. Cross arm 38 is supported by means of pillow blocks 39 between the ends of a pair of spaced support rods 40 which are secured by means of additional pillow blocks not shown to the rectangular base 31. Vacuum platen 35 is mounted on one end of a long shaft 41 and is spaced from platen 34 a distance equal to the thickness of the all-glass multiple sheet glazing unit to be produced. The shaft 41 is rotatably journaled in suitable bearings on the base 31 and may be turned by a handle or knob 42 for a purpose to be hereinbelow described.

As will best be seen in Fig. 3, each of the platens 34 and 35 is provided with depressions or vacuum cups 43 through which vacuum may be applied to the sheets to hold them against the faces of the respective platens. Grooves 44 are provided along the face of each of the platens and connect the vacuum cups 43 to a centrally disposed opening or bore 45 provided in both the stub shaft 36 and the longer shaft 41. A vacuum or negative pressure area is created in the vacuum cups 43 by means of a vacuum pump 46 (Fig. 5) mounted on a plate 47 above the base portion 31, the pump being connected by a suitable pipe 48 to the bore 45 in the stub shaft 36 and by pipe 49 to the bore (not shown) in shaft 41 which connects into pipe 48.

After the glass sheets 21 and 22 have been placed in proper position in contact with the vacuum platens, the vacuum created by the vacuum pump 46 retains the sheets in fixed position with respect to one another and the sheets are ready to be carried through the furnace to be sealed. Movement of the carriage is accomplished by means of a chain drive mechanism 50 (Fig. 4) to which the carriage 29 may be operably connected by means of a suitable coupling 51. The chain may be of a continuous type and may be driven by a variable speed drive to allow the sealing rate of the sheets to be controlled according to existing production requirements.

Turning now specifically to the furnace 26 (Figs. 3 to 5), it is supported by suitable framework indicated at 52 and is formed generally of a bottom wall 53, side walls 54 and 55 and a roof or ceiling 56 of fire brick or other suitable refractory material. For purposes of illustration, heat is supplied to the furnace by Nichrome or other wire filaments 57 fastened to the side walls 54 and 55, however, gas burners or other well known heating techniques may be employed to produce the desired heating effects.

To allow the support rod 40 and the shaft 41 to extend into the interior of the furnace so that platens 34 and 35 may support sheets 21 and 22 and move them past the sealing stations A and B etc., the furnace 26 is provided with a slot indicated at 58 (Fig. 5) in the side wall 55. This slot allows the platens 34 and 35 to be moved completely through the furnace and past each of the sealing stations A, B, etc., without having the support rods 40 and shaft 41 meet any obstructions.

At each of the sealing stations A, B, etc., there are provided sealing elements which include a bending or fusion burner 59 (Figs. 3 and 4), a forming or shaping tool 60 and a finishing burner 61 all carried on a suitable mounting base 62. More particularly, the fusion burners 59 (Fig. 4) have angularly disposed side rows of nozzles 63 mounted thereon. The nozzles 63 serve to direct flames 64 (Fig. 3) in impinging relation upon the edge portions of the glass sheets 21 and 22 as they move therepast to heat the edge portions to a pliable temperature.

As will best be seen in Figs. 3 and 4, the forming tool 60 includes forming wheels 65 rotatably mounted on substantially vertical axles 66. Each of the wheels preferably has a lower cylindrical ridge portion 67 which may be moved substantially in contact with one another, while the upper portions of the forming wheels are tapered upwardly and inwardly from the ridge portion and have a dished-out or concave portion as indicated at 68. This dished-out or concave portion is formed to correspond to the desired curvature or shape of the sealed edge side wall 24 (Fig. 2) of the multiple sheet glazing unit 20.

Thus as the sheets move into sealing area A for example, their marginal edge portions are heated to at least the bending temperature of the glass by the burner 59, and then are moved into engagement with the forming wheels 65. The forming wheels may be free to rotate, or they may be rotated at substantially the speed of movement of the sheets and act to force or bring the edge portions of the respective sheets 21 and 22 into contact with one another. In other words, the softened edge portions of the sheet upon passing through the restricted passageway between the forming wheels are caused to deflect inwardly to a point where they are brought into contact with one another and fused together.

If desired, after the side walls or edges of the all-glass unit have been bent to the desired configuration by the forming tool 60, the marks or scratches that may have been formed by the forming tool may be removed by a fire polishing process. For this purpose, there is provided the finishing or polishing burner 61 having two rows of aligned nozzles 69 (Fig. 4) which direct impinging flames 70 (Fig. 3) upon the sealed edge of the unit to again heat it slightly thus causing the marks or scratches to blend together to form an edge contour that is smooth.

While the sheets 21 and 22 have their edges, which are to be sealed together, generally parallel to the direction of movement of the sheets indicated at $x$ as they pass the sealing stations A, B, etc., in some cases, they are slightly tilted or have minor irregularities along the edges which sometimes affect the seal between the sheets. To overcome these problems, according to the present invention there is provided a novel leveling device which acts to move the sealing elements mounted on the base plate upwardly or downwardly to accommodate for changes in position of the sheets or irregularities along the edges of the sheet. More particularly, the leveling device comprises a sensing head 72 mounted on the base plate 62 in front of the fusion burner 59, and an actuating mechanism 73 (Fig. 9) which moves the base plate and the sealing elements in response to the signals transmitted from the sensing head.

Basically, the actuating mechanism 73 includes a diaphragm control valve 74 connected to the sensing head 72 which is adapted to convert the air pressure differentials of the sensing head into variations in low pressure oil; a four-way valve 75 which is connected to the diaphragm control valve 74 and regulates high pressure oil from a suitable pump as a result of changes in pressure of the low pressure oil system connected to the diaphragm control valve; and interlock valve 76 which is connected to the four-way valve 75 and normally shuts off the high pressure oil coming from the four-way valve when the glass sheets are not in the vicinity of the sealing area so as to lock the sealing elements in a stable position and a lift cylinder 77 connected to the interlock valve 76 which is adapted to move the sealing element base plate 62 upwardly or downwardly to place the sealing elements in correct sealing position.

With reference now to the sensing head 72, as will be best seen in Figs. 6, 7, 8, it is formed of two vertically disposed blocks 78 and 79 mounted on a base 80 secured to the sealing element mounting plate 62. The block 78 has a vertically disposed bore 81 therein which communicates with spaced orifice plates 82 and 83 mounted along the innerface of the block. The orifice plate 82 (Fig. 7) has a vertically disposed orifice slot 84 therein which communicates through an opening 85 in the block with the bore 81, and the orifice plate 83 has a horizontally disposed orifice slot 86 which is one half of the length of the vertically disposed orifice 84 in the plate 82. Air pressure is brought to the bore 81 by a pipe connection 87 suitably connected to the rear wall of the block 78.

As shown in Fig. 8, the block 79 is also provided along its innerface with spaced orifice plates 88 and 89. The orifice plate 88 is provided with a vertical orifice slot 90 which aligns with the vertical orifice slot 84 in plate 82 but is slightly wider, while the orifice plate 89 is provided with a horizontally disposed orifice slot 91 which aligns with but is substantially twice the length of the horizontal orifice slot 86 in the orifice plate 83, the purpose of which will be described hereinbelow. A pipe 92 connects the orifice slot 90 to a chamber 93 on one side of a diaphragm 94 in the diaphragm control valve 74, and the orifice slot 91 is connected by a pipe 95 to a chamber 96 on the other side of the diaphragm 94 in the control valve.

As will best be seen in Fig. 9, the diaphragm 94 is connected on its one side by a wire 97 to an oil jet pipe 98 pivoted to an oil pressure supply pipe 99. The jet pipe 98 is mounted for pivotal movement between either of two receiving jets 100 and 101 and is normally retained in an inoperative position (as shown in Fig. 9) between the respective receiving jets by a balancing spring 102 attached directly to the pipe 98 and a second balancing spring 103 secured to the other side of the diaphragm 94.

Consequently, when a uniform pressure exists in both pipes 92 and 95, the diaphragm 94 will be in equilibrium and the jet pipe 98 will be located in a position midway between the receiving jets 100 and 101 and no oil pressure will be communicated to either of the jets. However, when the pressure in either of the pipes 92 and 95 exceeds the other, it will cause the diaphragm to move in the direction $a$ or $b$ as illustrated in Fig. 9 causing the pressure jet 98 to move toward one of the receiving jets 100 or 101. Thus if nothing obstructs the air flowing from the orifice 84 the pressure in line 92 will be greater than that existing in line 95 because the orifice 84 is, as herein shown, twice as large as the orifice 86 and the pressure in the control valve chamber 93 will be greater than that in the chamber 96 causing the pressure jet 98 to move in the direction $a$.

According to the embodiment of the sensing head 72 shown, the sealing elements will be in proper sealing position with respect to the edges of the sheets 21 and 22 when the sheets obstruct half of the orifice 84. At this point, it will be evident that the pressures existing in lines 92 and 95 respectively will be substantially equal since the effective areas of the orifices 84 and 86 will be substantially equal.

The half orifice 86 at this point acts to reduce the effect of hot air or gases within the furnace upon the leveling characteristics of the sensing head 72. More specifically, as gas or air is heated, it expands creating increased velocity and pressure effects, which if only the orifice 84 were used would cause the line 92 to receive greater pressures indicating that the orifice area was not blocked to the half-way or sealing position. By using the half orifice 86, any increase in velocity and pressure as a result of temperature increases will be communicated through the line 95 to the control valve chamber 96 on the opposite side of the diaphragm 94 and balance any pressure increase in the chamber 93; that is, when the sheets obstruct half of the orifice 84 in sealing position.

Now, in passing between the blocks 78 and 79 of the sensing head 72, if the glass sheets 21 and 22 are higher than the half-way point of the orifice 84, or in other words, if the sensing head is low it means that the sealing elements mounted on the mounting plate 62 with the sensing head will also be low. Therefore, since the orifice 84 will be substantially unobstructed, and by virtue of the fact it is considerably larger than the orifice 86, a greater pressure will be established in pipe 92 as compared to pipe 95. This pressure differential will cause the diaphragm 94 to move in the direction $a$ swinging the pressure jet 98 toward the receiving jet 100. Oil under pressure is then directed to the receiving jet 100 which is connected by a pipe 104 to a small cylinder 105 on one side of the four-way valve 75.

If the sensing head 72 is too high, or in other words, if the sealing elements are too high in relation to the edges of the sheets 21 and 22 moving towards them, the sheets will block over half of the orifice 84 and the pressure in the pipe 95 will exceed that in pipe 92 since the effective area of the orifice 86 will be greater than that of orifice 84. Consequently, the diaphragm 94 will be moved in the direction $b$ and the pressure jet 98 will be moved toward the receiving jet 101 which is connected by a pipe 106 to a small pressure cylinder 107 on the four-way valve 75 on a side opposite that of the cylinder 105.

The four-way valve 75 includes an outer passageway 108 connected to a source of high pressure oil 109 and two inner compartments 110 and 111 adapted to be shut off from one another and the outer passageway by a valve stem 112 as shown in Fig. 9. The valve stem 112 may be moved in the direction $c$ or $d$ by means of pressure brought from the receiving jet 98 to the small pressure cylinders 105 and 107 which are suitably connected to the ends of the valve stem. When the pressure jet 98 directs fluid pressure to the receiving jet 100 it is communicated to the small cylinder 105 and thence the valve stem is moved in the direction $c$. This causes a valve stopper or piston 113 on the valve stem to close off a passageway 114 between the outer passageway 108 and the compartment 110. The oil under pressure from the pipe 109 then passes through the compartment 111 to a pipe 115 connected between the compartment 111 and the interlock valve 76.

If the pressure jet 98 directs the oil through the receiving jet 101, pressure is communicated through line 104 to the small cylinder 107 on the opposite side of the four-way valve 75 and causes the valve stem 112 to move in the direction $d$ causing a valve stopper 116 to close the passageway indicated at 117 between the compartment 111 and passageway 108 thus causing the oil to flow through the compartment 110 to a second line 118 connected to the interlock valve 76. While the valve stem has been shown to be in the middle position in Fig. 9, the flow of oil between the respective compartments 110 and 111 is restricted by another valve stopper 119 which seats against the casing of the valve when moved in either the direction $c$ or $d$.

The interlock valve 76 is normally closed and includes a plunger 120 having bores 121 and 122 therein which is normally urged to a closed or blocked position against a compression spring 123 by a solenoid 124. Upon deenergization of the solenoid as will be described later, the valve plunger 120 moves in the direction $e$ and allows the bores 121 and 122 to register with the pipes 115 and 118 so as to connect the latter pipes to pipes 125 and 126 coming into the upper side of the lock valve.

Pipes 125 and 126 on their other ends are connected to the lift cylinder 77 which is suitably mounted in a stationary position on the furnace framework 52 (Fig. 3). Mounted within the lift cylinder is a piston 128 connected by means of a piston rod 129 to a lift bracket 130 comprising a base 131 and slide rods 132, the slide rods being slidably mounted in bearings 133 and connected at their upper ends to the sealing element mounting base 62. As will be seen in Fig. 9 the pipe 125 is connected to the cylinder 77 below the piston 128 and the pipe 126 is connected to the cylinder on the other side of the piston. Thus when the plunger 120 of the lock valve is moved in the direction $e$ to allow the bores 121 and 122 to register with the respective pipes 115, 125 and 118, 126, the oil from the line 109 may be supplied to either side of the piston causing it to move upwardly or downwardly to move the respective sealing elements in proper sealing position depending on the position of the four-way valve 75.

As illustrative of a means of controlling the leveling device, there is shown in Fig. 9 an electrical circuit indicated generally at 129'. This circuit is adapted to be actuated by the carriage 29 as it carries the sheets through the furnace and is initiated by a start switch 130' which when depressed energizes solenoid coil 131. The circuit is thus completed from the main power line 132 to line 133, through switch 130, through line 134 to the coil 131, and then to the other main power line 135. This circuit causes the armature 136 of the solenoid 131 to move downwardly closing an interlock 137. By closing the interlock 137 a holding circuit is completed from main power line 132 through a normally closed interlock 138 on a stop switch 139, through line 140, through now closed interlock 137 to line 141, and thence through coil 131 to main power line 135. At the same time, movement of the armature 136 opens a normally closed interlock 142 on the armature between main power line 132 and a line 143 connected to the solenoid 124 on the interlock valve 76.

De-energization of the solenoid 124 allows the spring 123 to move the valve plunger 120 in the direction *e* causing the bores 121 and 122 therein to register with the pipes 115, 125 and 118, 126. Normally, the solenoid 124 is energized by a circuit through the main power line 132, through normally closed interlock 142, through line 143 to the solenoid, and then to main power line 135 and thus holds the valve plunger in the closed or solid line position shown in Fig. 9. When held in the closed position of Fig. 9 by solenoid 124, the interlock valve 76 locks the sealing elements in a fixed position to prevent minor variations in pressure in the sensing head from causing the actuating mechanism to hunt or to oscillate.

After the conveyor cart 29 has moved the glass sheets 21 and 22 past the sealing elements and the sheets have been sealed together along a peripheral edge thereof, it trips the stop switch 139 which has a normally closed interlock 138 thereof completing a holding circuit through solenoid coil 131. By so doing, the holding circuit is broken thus de-energizing the coil 131 and at the same time a normally open interlock 145 on the stop switch 139 is closed thus energizing a solenoid coil 146 causing the armature 136 to move upwardly to open the closed interlock 137. As the armature 136 moves to its "up" position, it closes the interlock 142 to energize the interlock valve solenoid 124 to move the plunger to the closed position shown.

Reviewing now the entire process of the invention sheets of glass 21 and 22 are initially supported in spaced relation by the vacuum platens 34 and 35. The sheets are then moved through the furnace toward the first sealing area A. As the sheets move into the sealing area they first pass the sensing nozzle 72 which is mounted on a common base 62 with the sealing elements which include the fusion burner 59, the forming tool 60 and the finishing burner 61. If the sealing elements are too low, the orifices 84 and 90 of the sensing head will be relatively unobstructed and the air pressure coming from the pipe 87 will be communicated to the chamber 93 of the control valve 74 and exceed the pressure communicated by the orifices 86 and 91 to the chamber 96. This pressure will then be communicated to the cylinder 77 and cause the piston 128 to move the sealing elements upwardly.

Should the sheets be low with respect to the sealing elements as they pass the sensing head 72, or in other words, so as to obstruct more than half of the orifices 84 and 90, the pressure from the pipe communicated through the orifices 86 and 91 to the chamber 96 of the control valve 74 will be greater than that in chamber 93. This will cause the piston 128 to move the sealing elements downwardly to a point where the sheets obstruct half of the effective area of the orifices 84 and 90, which according to the embodiment shown, places the sealing elements in correct sealing position with respect to the edges of the sheets.

At sealing position, when the orifices 84 and 90 are obstructed to the half-way point, it will be evident that the orifices 86 and 91 transmit pressure to the chamber 96 which is substantially equal to the pressure being communicated by the orifices 84 and 90 to the chamber 93 and a balanced condition will prevail. It will also be evident that no matter what changes in temperature develop, the resulting increases in pressure and velocity will be balanced in the respective chambers 93 and 96 since the effective orifice areas will be substantially equal.

After a pair of peripheral edge portions of the sheets pass the sensing head 72, they pass the fusion burner head 59 and then are moved into engagement with the forming wheels 65 and shaped to bring the edges into fusing contact with one another. From the forming tools the sheets pass the finishing burner 61 which heats the sealed edge portions to remove surface irregularities imparted to the sealed edge from the forming wheels.

Before moving to the second sealing area B, the sheets are rotated 90° by means of the crank handle 42 which rotates the shaft 41 and platen 35 to place another pair of aligned edges of the sheets 21 and 22 in position to be sealed in the manner noted above. After passing the sealing area B, the remaining edge areas of the sheets will be successively sealed as they pass subsequent similar sealing areas.

Figure 10:
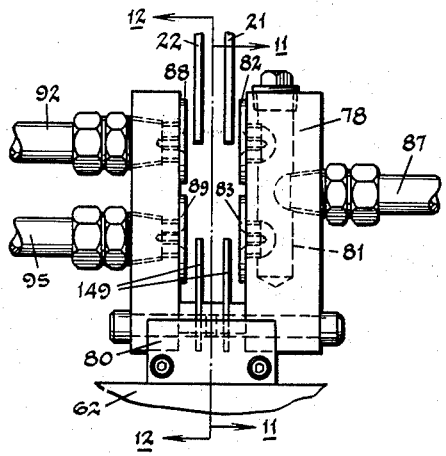
Fig. 10 is a fragmentary front elevation view of an alternate embodiment of the sensing means for the sealing element positioning device.
Figure 11:
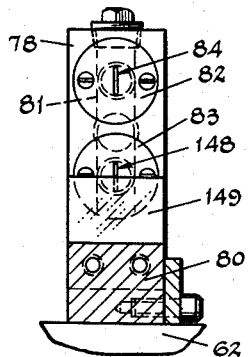
Fig. 11 shows the sensing means as viewed along lines 11—11 of Fig. 10.
Figure 12:
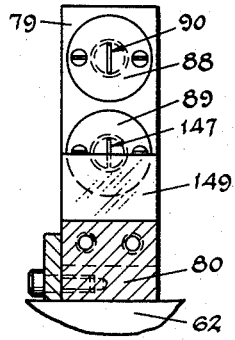
Fig. 12 shows the sensing means as viewed along lines 12—12 of Fig. 10.

An alternate embodiment of the sensing head 72 is shown in Figs. 10 to 12. This embodiment differs from the embodiment shown in Figs. 6 to 8 by providing vertical orifice slots 147 and 148 in the respective orifice plates 83 and 89. Orifice slots 147 and 148 are substantially equal in length and area to the orifice slots 84 and 90. To make the effective area of the orifice slot 147 equal to approximately one half the area of the orifice slot 84, there are provided two baffle plates 149 between the slots.

The baffle plates 149 are spaced from one another a distance approximating the spacing of the glass sheets 21 and 22 as they pass through the sensing head and thus substantially duplicate the turbulent characteristics of the fluid medium as it passes from the orifice slot 84 across the path of the spaced sheets to the orifice slot 90 when the sheets are in correct sealing position. As pointed out above when the glass sheets 21 and 22 obstruct approximately half of the orifice slots 84 and 90 the sealing elements are in correct sealing position with respect to the edges of the sheets and at this point the pressure of the fluid medium passing from the orifice slot 147 to the slot 148 will be substantially equal in pressure to that passing between the slots 84 and 90 and changes in temperature will affect the fluid medium from both sets of orifices equally and will balance out since they will oppose one another in the diaphragm control valve 74.

While the present invention has been described using the half obstruction of the orifices 84 and 90 as the proper location of the sealing elements with respect to the edges of the sheets, it will be apparent that the obstruction point for the proper sealing position of the orifices may be different while utilizing the same concept.

It is also to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. In apparatus for sealing together the edge portions of spaced glass sheets, means for supporting the glass sheets in spaced face-to-face relation, means for moving the said sheet supporting means and sheets supported thereby along a definite path, sealing means arranged along said path, mounting means for said sealing means, said mounting means being supported for movement toward and away from the path of said sheets, means for moving said mounting means, and actuating means carried by said mounting means for causing said moving means to move said sealing means into proper sealing position with respect to the marginal edge portions of the glass sheets as the sheets move therepast, said actuating means comprising means for passing a fluid medium across the path of said sheets and for transmitting variations in the pressure of said fluid medium to said moving means to cause said moving means to move said mounting means toward and away from said path.

2. Apparatus for sealing together the edge portions of spaced sheets of glass as claimed in claim 1, in which means are provided for balancing the effect of temperature on the fluid medium to prevent said actuating means from actuating said moving means because of pressure differentials of said fluid medium due to temperature.

3. In apparatus for sealing together the edge portions of spaced glass sheets, means for supporting the glass sheets in spaced face-to-face relation, means for moving the said sheet supporting means and sheets supported thereby along a definite path, sealing means arranged along said path, mounting means for said sealing means, said mounting means being supported for movement toward and away from the path of said sheets, means for moving said mounting means, and actuating means carried by said mounting means for causing said moving means to move said sealing means into proper sealing position with respect to the marginal edge portions of the glass sheets as the sheets move therepast, said actuating means including a pressure orifice and a receiving orifice, said pressure orifice being adapted to direct a fluid medium across the path of said sheets and said receiving orifice adapted to receive the pressure of said fluid medium which is not blocked by the said sheets as they move therepast.

4. Apparatus for sealing together the edge portions of spaced sheets of glass as claimed in claim 3, in which a second pressure orifice and receiving orifice are provided which balance the effect of pressure changes of said fluid medium as a result of temperature changes when said sealing elements are in correct sealing position.

5. Apparatus for sealing together the edge portions of spaced sheets of glass as claimed in claim 4, in which said second pressure orifice has an effective orifice area of approximately one half of the first named pressure orifice.

6. Apparatus for sealing together the edge portions of spaced sheets of glass as claimed in claim 5, in which means are provided for obstructing said second orifice to render its effective area approximately one half that of said first named orifice.

7. Apparatus for sealing together the edge portions of spaced glass sheets as claimed in claim 6, in which the means for obstructing the second orifice comprises a plurality of baffle plates spaced apart from one another.

8. Apparatus for sealing together the edge portions of spaced sheets of glass as claimed in claim 5, in which the second orifice is approximately one half the area of the first named orifice.

9. Apparatus for sealing together the edge portions of spaced sheets of glass as claimed in claim 5, in which variations in pressure of said first fluid medium are converted into changes in pressure of another fluid medium.

10. In apparatus for sealing together the edge portions of spaced sheets of glass, means for supporting said sheets in spaced face-to-face relation, means for moving said sheet supporting means and sheets carried thereby along a definite path, sealing means arranged along said path, mounting means for said sealing means, means for moving said mounting means toward and away from the path of said sheets, means adjacent the path of said sheets for directing a fluid medium toward the path thereof, means for receiving the fluid pressure from said last named means, means for converting variations in the fluid medium pressure into signals which cause said moving means to move said mounting means and sealing means toward and away from the path of said sheets.

11. Apparatus for fusing the edge portions of a pair of spaced glass sheets into a sealed edge wall, comprising supports for maintaining said sheets in a vertical fixed spaced relation with a lower edge of one sheet disposed substantially horizontally and in an opposed and substantially mutually aligned relation to the lower edge of said other sheet, a conveyor for moving said sheets along a path, heating means for raising the temperature of the lower edge portions of said sheets to the point at which they are pliable, forming tools arranged along said path having forming surfaces for intercepting said lower mutually aligned edges to urge them together into fusion contact, and means responsive to said sheets for vertically positioning said forming tools and heating means as a unit to align the same with the lower sheet edges.

12. Apparatus for fusing the edge portions of a pair of glass sheets as claimed in claim 11, in which said means responsive to said sheets includes a first means at one side of said path for emitting a sensing medium in a substantially horizontal line across the path of movement of the sheets at a vertical height substantially the same as that of said forming surfaces, and a second means located on the other side of said path for receiving said sensing medium and actuated thereby to cause vertical movement of the heating means and forming tools to bring them into aligned relation with said lower sheet edges.

13. Apparatus for fusing the edge portions of a pair of spaced glass sheets as claimed in claim 11, in which there is provided a second heating means for reheating a sealed edge wall to strengthen the same and provide a finished surface thereto.

References Cited in the file of this patent
FOREIGN PATENTS
731,976      Great Britain _____ June 15, 1955